United States Patent
Ricci et al.

(10) Patent No.: US 8,051,753 B2
(45) Date of Patent: Nov. 8, 2011

(54) TAPERED TURNING LATHE

(75) Inventors: Donato L. Ricci, Hager City, WI (US);
Brent Place, Hager City, WI (US)

(73) Assignee: Hydratight Operations, Inc., Butler, WI (US)

( * ) Notice: Subject to any disclaimer, the term of this patent is extended or adjusted under 35 U.S.C. 154(b) by 546 days.

(21) Appl. No.: 12/282,233

(22) PCT Filed: Mar. 22, 2006

(86) PCT No.: PCT/US2006/010316
§ 371 (c)(1),
(2), (4) Date: Feb. 3, 2009

(87) PCT Pub. No.: WO2007/123506
PCT Pub. Date: Nov. 1, 2007

(65) Prior Publication Data
US 2009/0229431 A1    Sep. 17, 2009

(51) Int. Cl.
*B23B 5/16* (2006.01)
*B23B 41/00* (2006.01)
(52) U.S. Cl. .......................... 82/113; 82/117
(58) Field of Classification Search .............. 82/113, 82/128, 131, 141, 46; 83/508.2, 508.3; D15/130
See application file for complete search history.

(56) References Cited

U.S. PATENT DOCUMENTS

| | | | | |
|---|---|---|---|---|
| 4,359,917 A | * | 11/1982 | Wilger et al. | 82/128 |
| 5,660,093 A | * | 8/1997 | Ricci | 82/113 |
| 6,065,378 A | * | 5/2000 | Ricci | 82/128 |
| D436,606 S | * | 1/2001 | Ricci | D15/130 |
| 6,615,696 B2 | * | 9/2003 | Ricci et al. | 82/113 |
| 6,799,494 B1 | * | 10/2004 | Ricci et al. | 82/113 |
| 6,901,828 B2 | * | 6/2005 | Ricci | 82/113 |

OTHER PUBLICATIONS

The International Search Report and Written Opinion in connection with PCT/US2006/010316, with a mailing date of Jul. 30, 2008.

* cited by examiner

*Primary Examiner* — Will Fridie, Jr.
(74) *Attorney, Agent, or Firm* — Quarles & Brady LLP

(57) ABSTRACT

A radially adjustable drive bracket (126) is affixed to, and rotatable with the drive gear (32), and a radially adjustable support bracket (128) is affixed to, and rotatable with the driven gear (42). A pair of parallel slide rails (30) are coupled at opposite ends to the drive bracket (126) and support bracket (128). A cutting head assembly (28) is slidably mounted on the slide rails (30), wherein a threaded lead screw (124) carrying a traveling nut (134) thereon causes longitudinal displacement of the cutting head assembly (28) along the slide rails (30). A cam arm (140) coupled through a one-way clutch to the lead screw (124) and adapted to be actuated by a tripper assembly (136) mounted so as to engage the cam arm (140) during orbiting movement of the drive and driven gear (32, 42).

11 Claims, 6 Drawing Sheets

TAPERED TURNING LATHE

FIELD OF THE INVENTION

This invention relates generally to an apparatus for machining bearing surfaces of rotating shafts of large machines, and more particularly to a portable journal turning lathe that is adapted to repair and refurbish a tapered work piece and that can be readily transported to a worksite, assembled in place on the tapered work piece to be machined, and then operated to remove any scoring and other surface irregularities from the shaft so that it is ready for replacement of its bearings.

DISCUSSION OF THE PRIOR ART

It often becomes necessary to refurbish the journal area on a shaft of large machines such as rock crushers or ship rudders. In the past, as described in U.S. Pat. No. 5,660,093, it was necessary to tear down the machine and transport the shaft to a machine shop where it may be machined by an engine lathe weighing 90 tons or more. This process of refurbishing the work piece inherently increased the downtime of the machine being refurbished. The '093 patent described a portable journal turning lathe that could be readily transported in a disassembled state to a job site and then assembled quickly and easily onto a cylindrical pipe or shaft to be turned.

The journal turning lathe described in the '093 patent comprises a pair of split clamshell assemblies that are held in parallel, spaced relationship to one another by a plurality of spacer rods. Two of the spacer rods support a tool carrier assembly for axial movement relative to a cylindrical shaft to be turned by the lathe. The tool carrier assembly includes at least one, but preferably two, cutting tool advancing mechanisms for controlling the radial placements of the cutting tools. The tool carrier assembly therefore controls the depth of the cut. The tool carrier assembly is arranged to be axially driven by threaded lead screw having a star wheel thereon which rotates the lead screw through a predetermined angle upon each rotation of the clamshell's movable ring member. The lead screw operates with a quick-release nut in the tool carrier assembly to permit rapid return of the tool carrier assembly to a home position upon completion of a pass.

The lathe in the '093 patent is not readily configured to machine a tapered work piece. The slide plate in the '093 patent is radially adjustable but not axially adjustable. Because the stabilizer brackets 26 are not capable of axial adjustment, if the work piece 12 were tapered, the tool carrier 44 can not be in contact with the work piece as the diameter of the work piece gradually decreases.

Likewise, U.S. Pat. No. 6,901,828, assigned to the applicant's assignee, is a journal turning lathe useful for machining a non-tapered work piece. The '828 patent has a plurality of feed screws so as to hold the clamshell carrying the cutting tool square and concentric to a cylindrical work piece. The '828 patent does not describe a means for axially adjusting the cutting tool to accommodate a tapered work piece. In fact, because the cutting tool is carried on an annular clamshell assembly 52 slidingly supported on guide shafts 42 and 44, the lathe is inherently incapable of machining a tapered work piece.

The journal turning lathe of the present invention obviates this drawback by providing a slide base capable of axial adjustment allowing the cutting head to be adjusted to the correct taper angle.

SUMMARY OF THE INVENTION

The foregoing features and advantages of the present invention are achieved by providing a tapered turning lathe for machining the outside surface of a tapered shaft. The tapered turning lathe comprises a drive housing and a support housing connected with a plurality of support shafts so as to be held in parallel, spaced relation to one another. The drive and support housings each have a plurality of threaded locators, which are used to hold and center the machine to the shaft. Both housings also support drive gear members which rotate on adjustable bearings held in the housing. A cutting head is moved by a feed screw and slides on two parallel shafts whose opposed ends are held in brackets that are radially adjustable, allowing the parallel shafts to be set parallel to the surface of a tapered work piece.

The cutting head contains a tool block which holds a tool bit. The tool block is affixed to the cutting head by at least two adjustable gibs. The tool block height can be adjusted by turning a tool bit adjustment screw for setting the depth of cut.

The threaded lead screw carries a traveling nut that is operatively coupled to the cutting head, whereby rotation of the lead screw causes longitudinal displacement of the cutting head along the two parallel shafts that are inclined at the same angle that the work piece is tapered. At least one tripper can be bolted to the drive housing. The trippers are used to push a cam, which is coupled through a one-way clutch to the lead screw to advance the cutting head in the axial direction a predetermined distance determined by the thread pitch or the lead screw. A feed knob is operatively coupled to the clutch whereby when the feed knob is pushed down, the clutch is engaged allowing the cutting head to be driven; but when the feed knob is pulled up, the clutch is disengaged and the feed screw can be rotated manually to return the cutting head to a home position.

A first radially adjustable slide plate is affixed to and rotates with the drive gear of the drive housing. Turning a height adjustment screw of the slide plate allows the parallel shafts carrying the cutting head to be adjusted to the correct taper angle. The support housing end of the tapered turning lathe supports the opposite end of the alignment shafts and the feed screw. A second radially adjustable slide plate is bolted to the drive gear face of the support housing. A bracket slide slides inside the slide base and is held in position with a second height adjustment screw. A pair of axial adjustment brackets is coupled to an end bracket, which supports the opposite ends of the parallel alignment shafts and the feed screw. The axial adjustment brackets allow axial adjustment of the cutting head.

The drive housing gear is rotated by a motor bolted to the drive housing. A coupling shaft is operatively coupled through a first gear train at a first end to the drive housing drive gear and through a second gear train at a second end to the support housing drive gear. The rotation of the drive housing drive gear is thereby translated to the support housing drive gear. By turning the drive gears on both ends of the tapered turning lathe, the cutting head alignment shafts will stay parallel to the center line of the work piece.

BRIEF DESCRIPTION OF THE DRAWINGS

The foregoing features, objects and advantages of the invention will become apparent to those skilled in the art from the following detailed descriptions of a preferred embodiment, especially when considered in connection with the accompanying drawings in which.

DESCRIPTION OF THE PREFERRED EMBODIMENT

Figure 1:
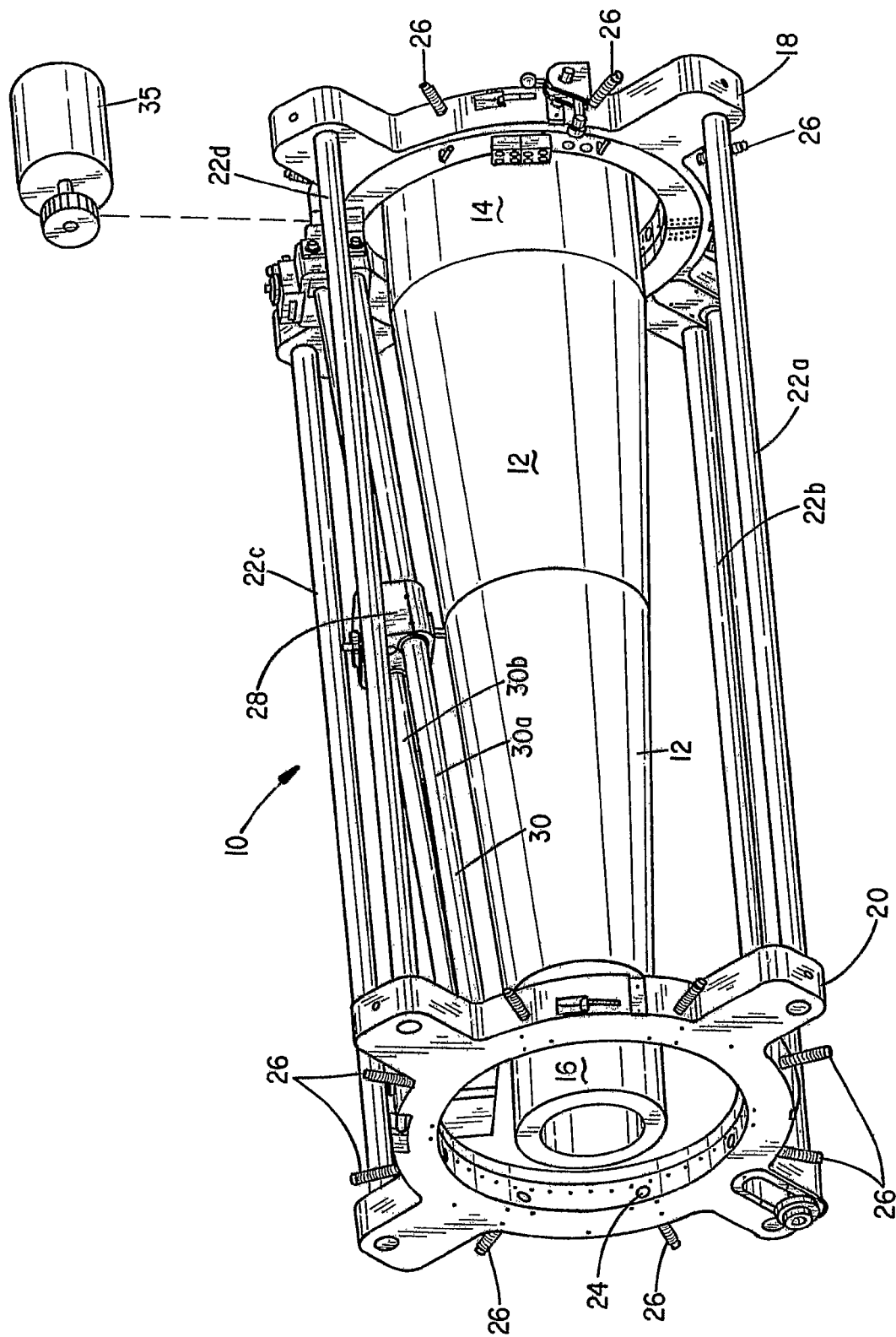
FIG. 1 is a perspective view of the tapered turning lathe of the present invention.

Referring first to FIG. 1, there is indicated generally by numeral 10 a tapered journal turning lathe constructed in accordance with the present invention. It is adapted to be mounted on a tapered work piece 12 having a first end 14 and a second end 16. Because the work piece 12 is tapered, the diameter of the work piece 12 gradually decreases from the first end 14 to the second end 16.

The journal turning lathe 10 is seen to comprise an annular drive housing 18 and an annular support housing 20 each having an inside diameter large enough to surround the tapered work piece 12 to be turned. The drive housing 18 and support housing 20 are connected by four support shafts 22a-22d. Formed radially through the thickness dimensions of both the drive housing 18 and the support housing 20 at intervals are equally radially spaced threaded bores, as at 24, into which there is threadily fitted a plurality of threaded locator screws 26 which are used to hold and center the lathe 10 to the tapered work piece 12. A cutting head assembly 28 is translated along a pair of parallel guide shafts 30a-30b between the drive housing 18 and the support housing 20.

Figure 2A:
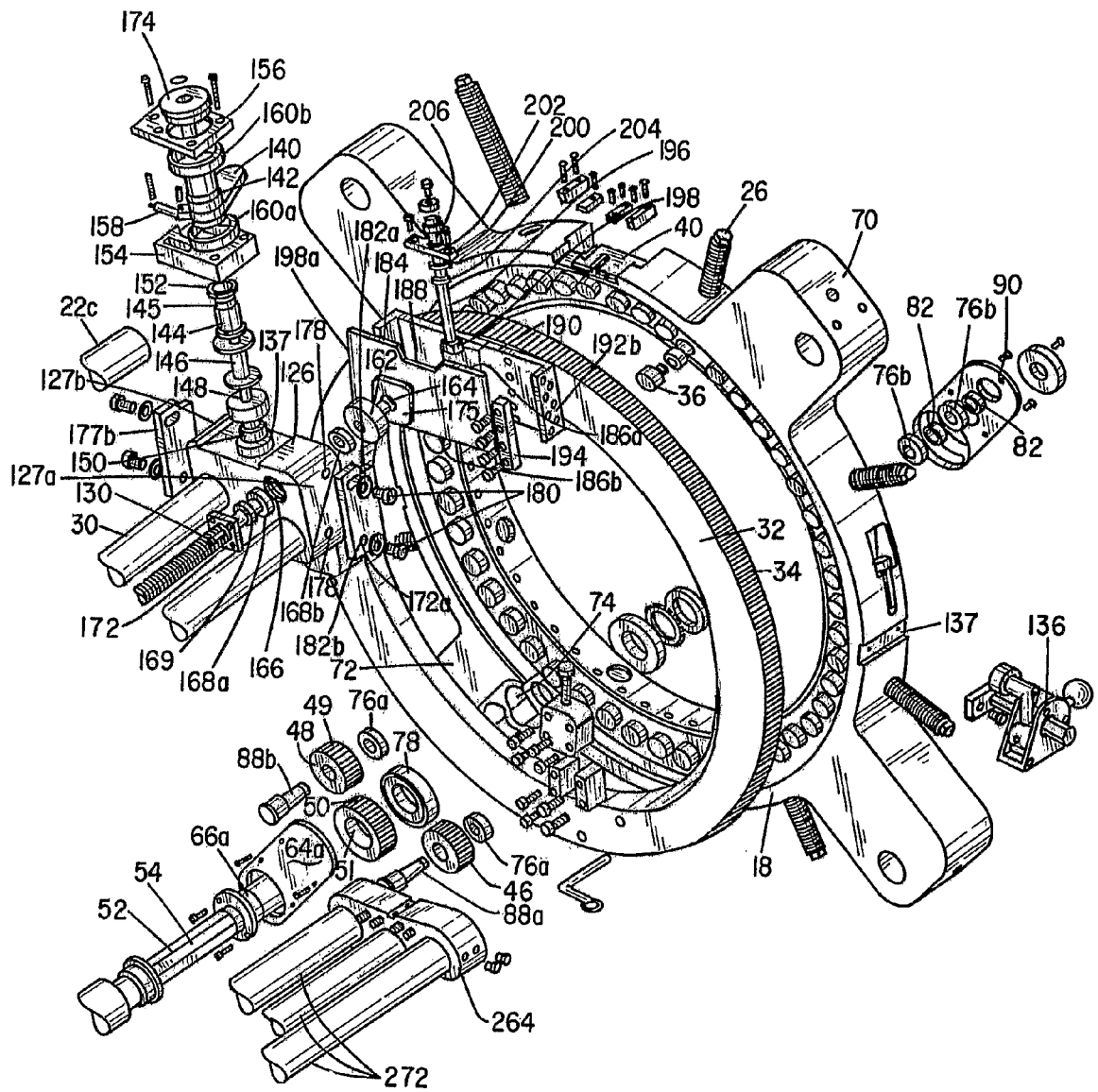
FIG. 2A is an exploded view of the tapered turning lathe of FIG. 1, showing the first drive bracket assembly, and the drive housing bracket assembly.
Figure 2B:
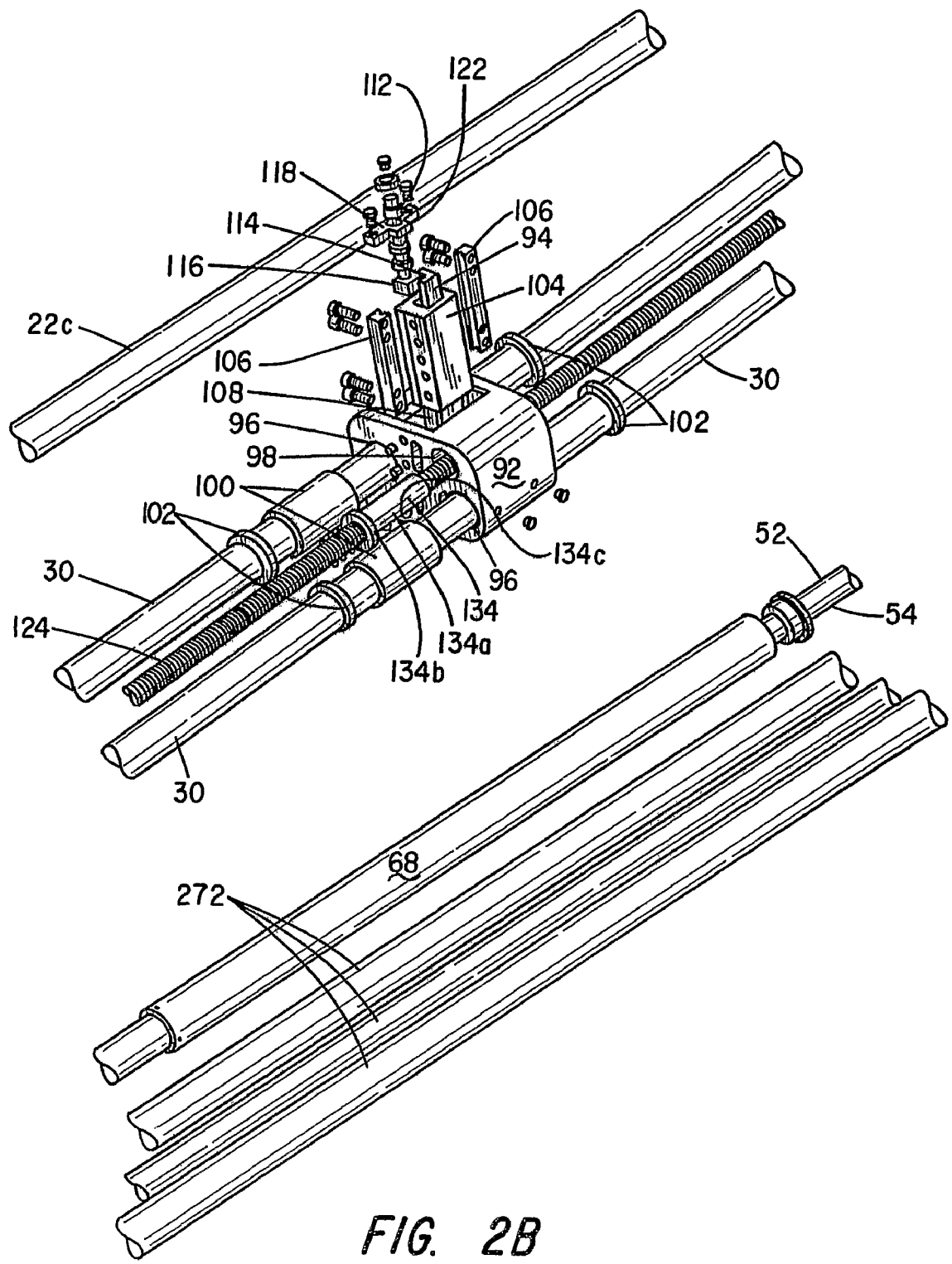
FIG. 2B is an exploded view of the tapered turning lathe of FIG. 1, showing the cutting head assembly, and the drive screw.
Figure 2C:
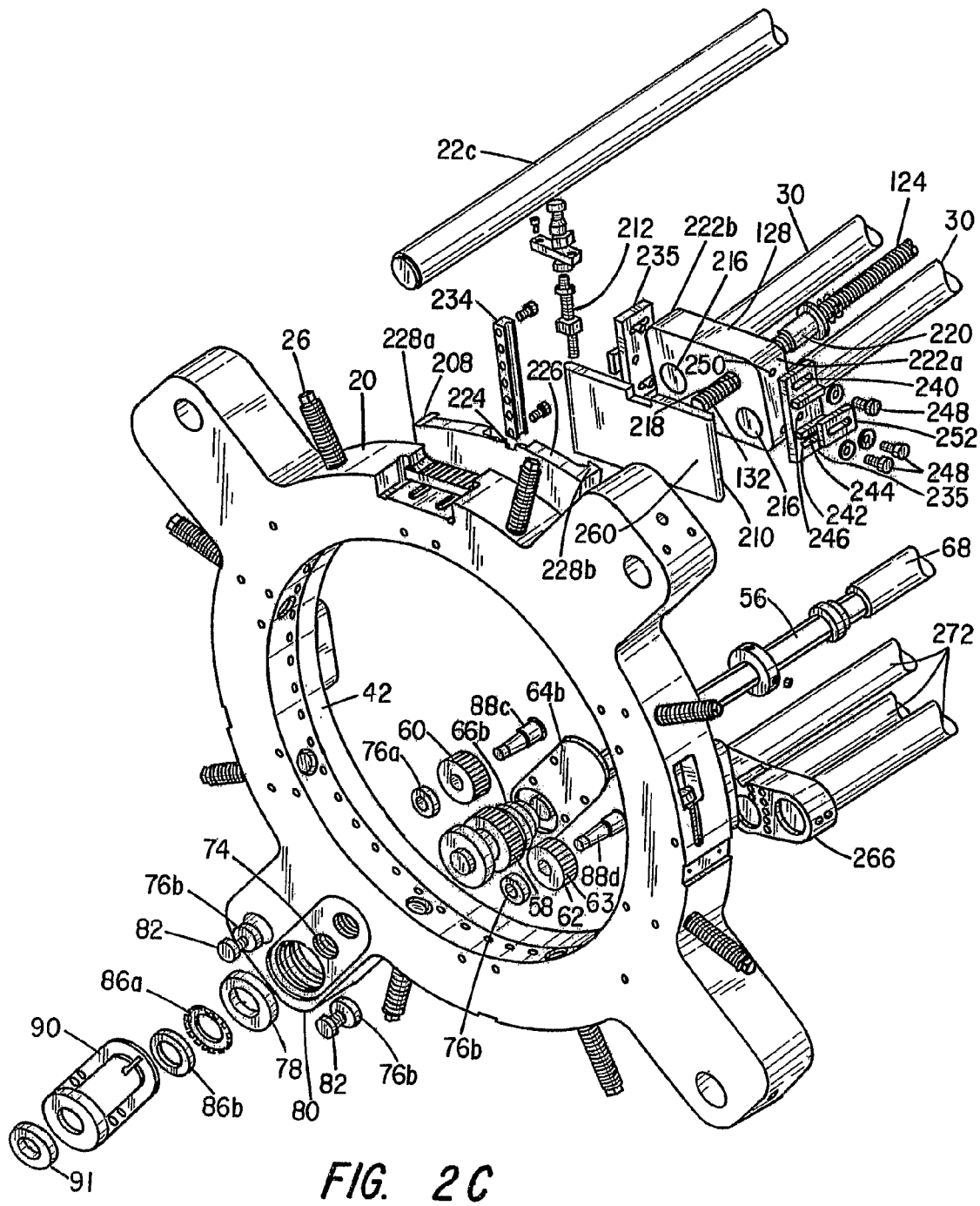
FIG. 2C is an exploded view of the tapered turning lathe of FIG. 1, showing the second drive bracket assembly, and the support housing bracket assembly.

FIGS. 2A-2C collectively show an exploded view of the journal turning lathe 10. In FIG. 2A the drive housing 18 is a first annular member supporting a drive gear 32 journaled for rotation with respect to the drive housing 18. The drive gear 32 includes drive gear teeth 34, said drive gear 32 is journaled for rotation on the drive housing by adjustable bearings 36 that extend in the axial direction from the flat side surface of the drive housing 18 to fit into an annular groove formed inward from a side surface of the drive gear 32. The drive gear 32 is adapted to be driven by a suitable motor 35 (FIG. 1), such as a pneumatic, hydraulic or electric motor. The motor is mounted in the motor mount position 40 of the drive housing 18.

FIG. 2C shows that the support housing 20 is a second annular member supporting an annular driven gear 42 journaled for rotation with respect to the support housing 20. The driven gear 42 is identical to the drive gear 32 in that it is journaled for rotation on bearings (not shown) that extend in an axial direction from the flat side surface of the support housing 20.

As the drive gear 32 is rotated by the motor 35, the drive gear 32 turns a series of idler gears journaled in the drive housing 18. More particularly, the teeth 34 of the drive gear 32 mesh with a first spur gear 46 and rotates the first spur gear 46 on the axis of a first idler shaft 88a. The first spur gear 46 also meshes with a second spur gear 48, that rotates on the axis of a second idler shaft 88b. The second spur gear 48 meshes with the coupling shaft collar gear 50, rotating the coupling shaft collar gear 50. A coupling shaft 52, having a first end 54 and a second end 56 (shown in FIG. 2C), extends between the drive housing 18 and the support housing 20. The first end 54 of the coupling shaft 52 is inserted into a center opening 51 of the coupling shaft collar gear 50. Specifically a first collar 66a caps the first end 54 of the coupling shaft 52 and the first collar 66a is inserted into the opening 51 of the coupling shaft collar gear 50.

A second collar 66b caps the second end 56 of the coupling shaft 52 and the second collar 66b is inserted into a second collar gear 58. The second collar gear 58 is contained in the support housing 20. The second collar gear 58 meshes with a first support housing idler gear 60 rotating on third idler shaft 88c, and the first support housing idler gear 60 meshes with second support housing idler gear 62 rotating on fourth idler shaft 88d.

A first and second front cover 64a and 64b each conceal the first and second collar 66a and 66b. When the motor rotates the drive gear 32, the drive gear 32 rotates the drive housing idler gears and the coupling shaft collar gears 50. Rotation of the coupling shaft collar gear 50 rotates the coupling shaft 52. When the coupling shaft 52 is rotated, the second collar gear 58 rotates in the support housing 20 turning the first support housing idler gear 60 and the second support housing idler gear 62. The teeth 63 of the second support housing idler gear 62 mesh with the teeth (not shown) of driven gear 42. By turning both the drive gear 32 and the driven gear 42 simultaneously the cutting head guide shafts 30 will stay aligned with the center line of the tapered work piece 12.

A protective sheath 68 protects a worker from getting entangled in the coupling rod 52. The coupling shaft 52 typically is hexagon-shaped in cross-section.

The drive housing 18 and the support housing 20 each have a plurality (4) of support shaft guides 70 extending radially from the housings. In the support shaft guide specifically referred to by numeral 72 on drive housing 18 there are a plurality of idler gear holes 74 where the driver housing idler gears are disposed. To facilitate rotation of the first and second spur gears 46, 48 in the idler gear holes 74, a Timken cone 76a and a Timken cup 76b fit between the first and second spur gears 46, 48 and the rear cover 90. A Timken cup bearing 78 is disposed behind the coupling shaft collar gear 50 in the idler gear slots 74. The corresponding arrangement is found in a shaft guide 80 of the support housing 20. In both arrangements a lock nut 86b and lock washer 86a prevent the Timken cup bearing 78 from falling out of the backside of the idler gear openings 74. Likewise a hex jam nut 82 couples the spur gears to idler shafts 88 on which the spur gears rotate. A rear cover 90 bolts the idler gears into the support shaft guide, and is secured by hex clamp collar 91.

The cutting head assembly 28 (FIG. 1) comprises a cutting head 92 and tool bit adapter 94 (tool bit not shown in FIG. 2b) adjustable secured thereto. A pair of guide shaft bores 96 extend axially through the cutting head 92, along with a feed screw bore 98. Guide bushings 100 encircle each guide shaft 30. The guide bushings 100 are inserted into the guide shaft bores 96 and are sealed in the cutting head 92 by elastomeric seal members 102. Seal members are placed on each end of the guide bushings 100 to seal the bushings 100 in the cutting head 92, preventing lubricants and metal debris from entering the cutting head. The bushings 100 ensure smooth translation of the cutting head 92 along the guide shafts 30.

The cutting head 92 also contains a tool block 104 which holds the tool bit. The tool block 104 is held to the cutting head 92 by adjustable gibs 106. The tool block 104 and adjustable gibs 106 are inserted into the tool block slot 108, said tool block slot 108 extends through the cutting head 92 perpendicular to the guide shaft bores 96 and feed screw bore 98. A tool bit adjustment screw assembly is used to adjust the height of the tool block 104.

The tool bit adjustment screw assembly comprises a dial member 112 operatively coupled to a tool block feed screw 114 such that rotation of the dial member 112 rotates the tool block feed screw 114. A tool block feed nut 116 runs along the tool block feed screw and is operatively coupled to the tool block 104 so that rotation of the tool block feed screw 114 results in vertical translation of the tool block 104. A feed screw bracket 118 is secured to the top surface of the cutting head 92 and the tool block feed screw 114 is journaled by a feed screw bushing 120 disposed in a center opening 122 of the feed screw bracket 118.

The cutting head 92 is translated along the guide shafts 30 by a threaded lead screw 124 which extends between a radially adjustable drive bracket 126 mounted on the drive housing 18 and a radially adjustable support bracket 128 mounted on the support housing 20. The threaded lead screw 124 has a first end 130 coupled to the drive bracket 126 and a second end 132 coupled to the support bracket 128. The cutting head 92 is carried along the feed screw 124 by feed nut 134 operatively coupled to the feed screw 124. As shown in FIG. 2B, the feed nut 134 comprises an internally threaded tube member 134a surrounding the feed screw 124 and with an annular flange 134b formed at one end of the tube member 134a. The tube member 134a has an inner surface (not shown) with threads cooperating with the threads of the feed screw 124 to carry the feed nut 134 along the feed screw 124. The tube member 134a is inserted in the feed screw bore 98 of the cutting head 92. The annular flange 134b is then secured to the wall of the cutting head 92 by feed nut fasteners 134c.

Figure 3:
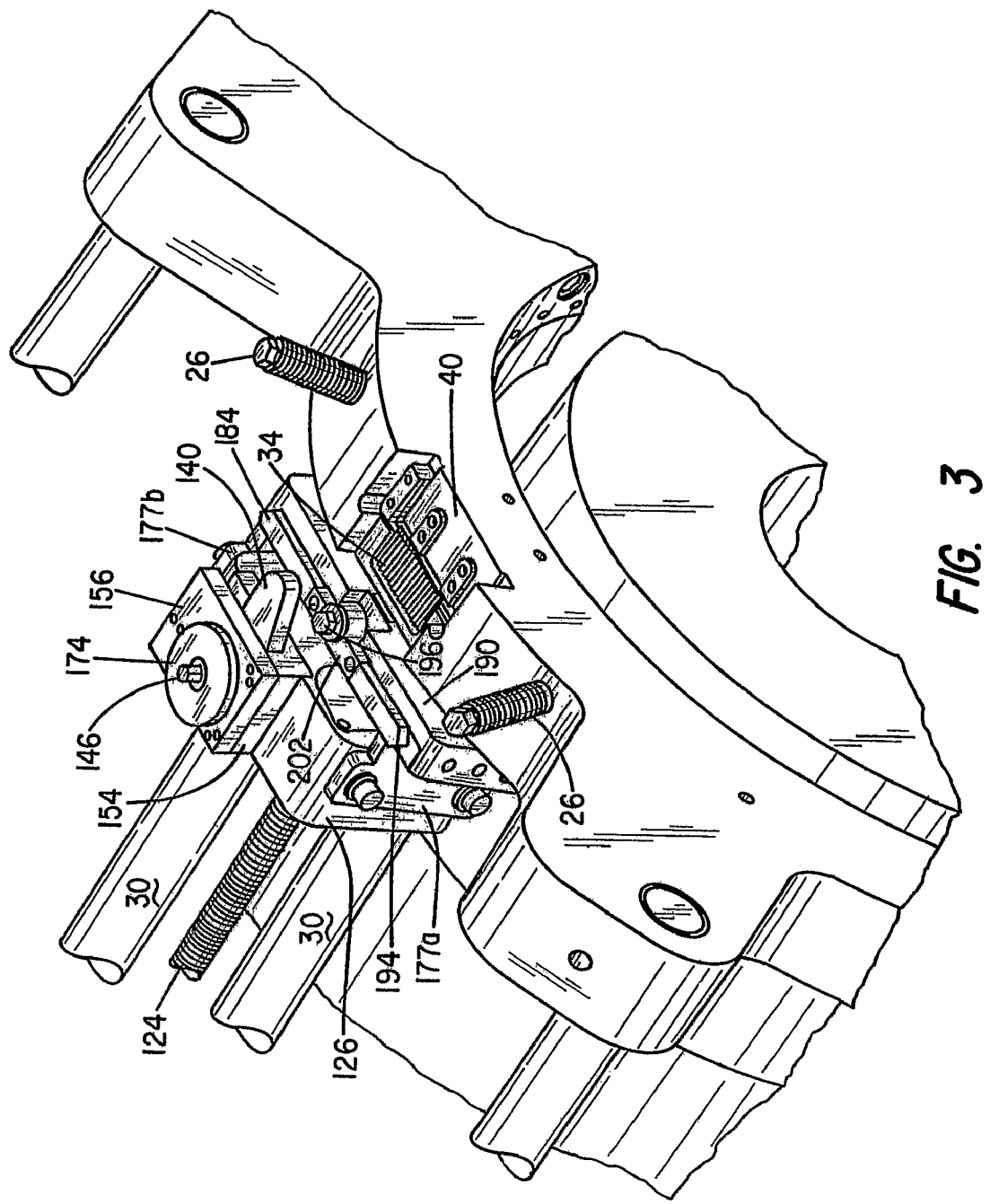
FIG. 3 is a top perspective view of the first drive bracket assembly of the tapered turning lathe of FIG. 1.

With particular attention directed to FIGS. 2A and 3, a cam arm assembly is disposed in the cam arm assembly aperture 137 of the drive bracket 126 to effect rotation of the feed screw 124 in a manner yet to be described. One or more trippers 136 are bolted to the stationary drive housing 18 as at tripper slot 137 on the circumference of the drive housing 18. The trippers 136 cooperate with cam assembly as it orbits about the work piece 12 which then turns the feed screw 124 and advances the cutting head 92 in the axial direction.

The cam assembly comprises a cam arm 140 having a one-way clutch engaging a gear train which rotates the feed screw 124. The one-way clutch includes a roller clutch member 142 embedded in the cam arm 140. The roller clutch member 142 is coupled to a clutch shaft 144 so that rotation of the clutch member 142, in turn, rotates the clutch shaft 144. A clutch shaft bushing 152 reduces friction between the clutch shaft 144 and the roller clutch member 142.

The cam arm 140 is housed in a mount housing comprising a mount bracket 154 and a mount cover 156. The mount bracket 154 has a slot in one side which the cam arm 140 extends out of and an aperture in the bottom for the clutch shaft 144 to pass through into the cam arm assembly aperture 137. A spring 158 extends between a second sidewall of the mount bracket 154 and the cam arm 140 so that the cam arm 140 is made to return to its original position after the cam arm passes by a tripper 136. A first and second mount bearing 160a and 160b sandwich the cam arm 140 to reduce friction when the cam arm 140 rotates in the mount bracket 154 and the mount cover 156.

A gear train shaft 146 is coupled to the clutch shaft 144 so that the rotation of the cam arm 140 rotates the gear train shaft 146 inside the drive bracket 126. A gear shaft helical gear 148 is coupled to the gear train shaft 146 at an end opposite of where the gear train shaft 146 is coupled to the clutch shaft 144. A gear shaft bushing 150 is coupled to the gear train shaft 146 below the gear shaft helical gear 148 to reduce friction between the gear train shaft 146 and the drive bracket 126.

A feed screw drive gear 162 is coupled to the first end 130 of the feed screw 124 inside the drive bracket 126. The gear shaft helical gear 148 meshes with the feed screw drive gear 162 so that rotation of the cam arm assembly rotates the feed screw drive gear 162, thus incrementally rotating the feed screw 124 advancing the cutting head. The feed screw drive gear 162 is affixed to the feed screw 124 by flex lock nut 164. The first end 30 of the feed screw 124 is inserted into the drive bracket 126 at a drive housing feed screw aperture 166 which is perpendicular to the cam arm assembly aperture 137. A Timken cone 168a and Timken cup 168b facilitate rotation by reducing friction between the first end 130 of the feed screw 124 and the drive bracket 126 in the drive housing feed screw aperture 166. An oil seal is disposed proximate the Timken cone 168b to prevent lubricant from escaping out of the drive housing feed screw aperture 166. The drive housing feed screw aperture 166 is closed off at one end by a feed screw seal cover 172 and a feed screw access cover 175 at the other.

A feed knob 174 is provided for reciprocally engaged or disengaging the clutch. The clutch shaft 144 has first end 145 with a hexagon shape that engages the feed knob 174. Specifically, the underside (not shown) of the feed knob 174 has an octagon recess that mates with the first end 145 of the clutch shaft 144. When the feed knob 174 is pushed down the clutch is engaged so that the drive gear 32 rotates past a tripper 136, the cam arm 140 is deflected, turning the gears 148, 162 located in the drive bracket 126, which causes the feed screw 124 to turn. Conversely, when the feed knob 174 is pulled up, the feed knob 174 is released from the clutch shaft 144, disengaging the one-way clutch 142. The feed screw 124 can then be rotated manually by turning the gear train shaft 146.

The drive bracket 126 has a first and second side bracket 177a and 177b (FIG. 3) bolted to opposed side surfaces 127a, 127b thereof. Each side surface 127a, 127b has a pair of spaced apart bolt apertures 178 each adapted to receive side bracket fasteners 180. The side brackets 177a and 177b have corresponding spaced-apart fastener apertures 182a and 182b for receiving the side bracket fasteners 180. The top fastener aperture 182a is arcuate shaped and the bottom fastener aperture 182b is circular. The side bracket fasteners 180 then secure the side brackets 177a and 177b to the drive bracket 126 by having them inserted into the bolt apertures 178 through the corresponding fastener apertures 182a and 182b. Because the bottom fastener apertures 182b are circular and the top fastener aperture 182a is arcuate shaped, the drive bracket 126 can pivot along the axis of the bottom fastener apertures 182b, but the degree of pivot angle is limited by the length of the arcuate shaped top fastener aperture 182a.

Each side bracket 176a, 176b is fastened to a drive bracket slide member 184. The drive bracket slide member 184 is a generally rectangular plate having a top 186a, a bottom 186b and two sides 186c, 186d. The top 186a has a bracket groove 188 cut into it. The drive bracket slide 184 slides inside the confines of a drive bracket slide base 190.

The drive bracket slide base 190 is a rectangular plate having a first and second flange 192a, 192b projecting perpendicularly from the two ends of the plate. A slide gib 194 abuts the first flange 192a and the drive bracket slide 184 slides along the slide gib 194. Turning the height adjustment screw 196 (FIG. 3) located on the drive bracket slide 184 moves the drive bracket slide 184 up and down the slide gib 194. The height adjustment screw 196 is a feed screw with a drive bracket feed nut 198 coupled to slide base 190. A slide plate feed screw bracket 200 is fastened into the bracket groove 188, and the height adjustment screw 196 passes through and is held by a central aperture 202. A feed screw bushing 204 reduces friction between the height adjustment screw 196 and the slide plate feed screw bracket 200. A dial 206 is used to turn the height adjustment screw 196. When the height adjustment screw 196 is rotated the drive bracket feed nut 198 slides the slide plate along the slide base 190, allowing the guide rods 30 supporting the cutting head 92 to be adjusted to the correct angle of the taper of the tapered work piece 12.

Figure 4:
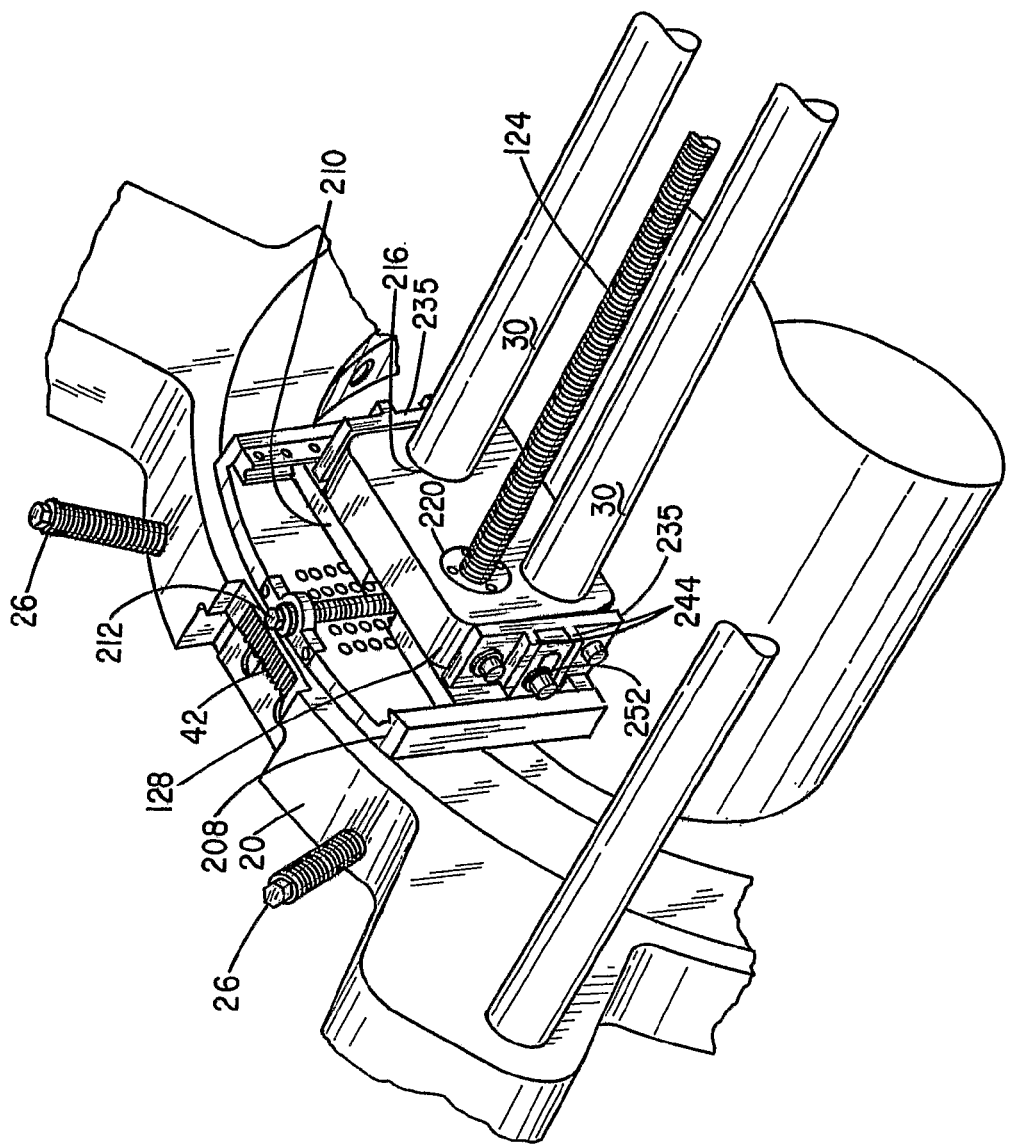
FIG. 4 is a perspective view of the second drive bracket assembly of the tapered turning lathe of FIG. 1.

Turning now to FIG. 4, the end bracket 128 supports the opposite ends of the guide shafts 30 and the second end 132 (FIG. 2c) of the feed screw 124. The end bracket has guide shaft bores 216 into which the opposite ends of the support shafts 30 are inserted. The second end 132 of the feed screw 124 is inserted into the feed screw bore 218 in the end bracket 128. The second end 132 of the feed screw 124 is held in the support feed screw bore 218 by the feed screw bushing 220. The support bracket 128 is generally block-shaped with two side ends 222a and 222b.

A support housing slide base 208 is bolted to the annular driven gear 42 of the support housing 20. The support housing slide base 208 is a generally rectangular plate having a bracket groove 224 cut into the top portion 226 and two flange members 228a and 228b extending outward from the opposite ends of the base 208. The first flange 228a extends at approximately a 90° angle from the base 208. The second flange 228b also extends from the bracket slide 210 at an angle of 90°, but also forms a v-cut between the base 208 and the end of the flange 228b.

A support housing slide member 210 slides inside the support housing slide base 208 and is held in position by height adjustment screw 212. The support housing bracket slide 210 is a generally rectangular plate having a front side and a back side, and a first and second end. A support slide gib 234 is disposed between the first flange 228a of the base plate 208 and the first end 232a of the slide 210, and the slide plate 210 slides in the slide gib 234. Because the second flange 228b integrally forms a gib, the slide 210 slides in the slide base 208.

The support housing height adjustment screw 212 is identical in construction to the height adjustment screw 196 of the drive bracket slide 184, and can be understood to work in an identical fashion.

Bolted to the opposed side surface of support bracket 128 are two axial adjustment brackets 235. Each axial adjustment bracket 235 has a top arcuate shaped aperture 240 in spaced-apart relation to a bottom arcuate shaped aperture 242. Two parallel, spaced-apart flanges 244 project from the front side 236 of the axial adjustment bracket 234. A support aperture 246 is disposed between the parallel, spaced-apart flanges 244.

The axial adjustment brackets 235 are coupled to the support bracket 128 and hold the support bracket to the support housing bracket slide 210. Axial adjustment fasteners 248 pass through the top and bottom aperture 240, 242 and are secured to the support bracket 128 by fastener bores 250 disposed in spaced-apart relation to each other on the ends 222a, 222b of the support bracket 128. A support side bracket 252 is fastened to the axial adjustment bracket 235 between the parallel flanges 244 by passing a support side fastener 248 through the support side bracket aperture 256 and into the support aperture 246. The support side bracket 252 is fastened to the support housing bracket slide 210.

Bolted or otherwise affixed to the drive gear 32 is a first stabilizer bracket 264. A second stabilizer bracket 266 is affixed to the driven gear 42. Fitted into axially extending bores (not shown in drawings) in the first stabilizer bracket 264 and into corresponding bores formed in the second stabilizer bracket 266 are three parallel, spaced-apart stabilizer rods 272. The stabilizer rods 272 along with stabilizer brackets 264, 266 not only function to maintain rigidity between the housings 18 and 22, but also function as a counterweight for the mass of the guide shafts 30, and feed screw 124 and cutting head assembly 12.

OPERATION

Having described the mechanical configuration of the tapered journal turning lathe 10 of the present invention, consideration will next be given to its mode of operation.

The workman will arrive at the job site with the journal turning lathe assembly disassembled into several subassemblies. The various subassemblies are assembled about the tapered work piece 12 to be turned as illustrated in FIG. 1. The drive housing 18 and support housing 20 will be positioned and adjusted so that they are both coaxially disposed with the axis of the work piece 12.

The workman will then adjust the angle of the guide shafts 30 to follow the taper of the work piece 12 using the height adjustment screws 196 and 212 to raise and lower the ends of the guide rods 30. The cutting head 92 is then positioned to the desired location along the guide shafts 30 using the feed nut mechanism in its non-engaged state. Once the starting point for the cut is set, the feed knob 174 will be pushed down so as to cause the clutch 142 to engage the clutch shaft 144 and cause the feed screw to turn only when the tripper assembly 136 is engaged. Next, the workman will adjust the depth-of-cut of the tool bit using dial member 112 for rotating the tool bit adjustment screw assembly to affect displacement of the tool block 104.

The drive motor (not shown) meshed to the drive gear 32 will then be turned on to rotate the drive gear ring 32 as well as the drive bracket 126, support bracket 128, the guide shafts 30 and the cutting head assembly 28 mounted thereon. Diametrically disposed relative to the foregoing assembly is the counterweight assembly including stabilizer brackets 264 and 266, and the stabilizer rods 272. Each rotation will cause the tool bit to remove a layer of metal from the work piece 12. Also, at various points in the revolution of the assembly, the cam arm 140 will be engaged by tripper 136 causing the feed screw 124 to rotate advancing the cutting head assembly 28 along the length of the work piece 12.

In particular, engagement of the cam arm 140 will also rotate the gear shaft helical gear 148 which meshes with the feed screw drive gear 162 to rotate the feed screw 124, thus advancing the cutting head 92 in an axial direction.

This invention has been described herein in considerable detail order to comply with the Patent Statutes and to provide those skilled in the art with the information needed to apply the novel principles and to construct and use such specialized components. However, the invention can be carried out by specifically different equipment and devices. Various modifications, both as to the equipment details and operating procedures, can be accomplished without departing from the scope of the invention itself.

What is claimed is:

1. A journal turning lathe for machining tapered shafts comprising:
   a) a drive housing including a first annular member and an annular drive gear journaled for rotation with respect to the first annular member;
   b) a support housing comprising a second annular member and an annular driven gear journaled for rotation with respect to the second annular member;
   c) a plurality of spacer rails coupled between the drive housing and the support housing for maintaining the drive housing and support housing in parallel, spaced-apart relation with the first annular driving gear facing the annular driven gear;

d) a motor attached to the drive housing for driving the annular drive gear;

e) a coupling shaft extending from the drive gear to the driven gear, the coupling shaft having a gear train at opposed ends thereof arranged such that rotational movement of the drive gear is transmitted to the driven gear;

f) a radially adjustable drive bracket assembly affixed to and rotatable with the annular drive gear and a radially adjustable support bracket assembly affixed to and rotatable with the annular driven gear;

g) a pair of parallel slide rails coupled at opposed ends to said drive bracket assembly and said support bracket assembly;

h) a cutting head slidably mounted on the pair of parallel slide rails;

i) a threaded lead screw carrying a traveling nut thereon, the nut being operatively coupled to the cutting head whereby rotation of the lead screw causes longitudinal displacement of the cutting head along the pair of slide rails; and j) a cam arm coupled through a one-way clutch to the lead screw and adapted to be actuated by a tripper assembly mounted so as to be engaged by the cam arm during orbiting movement of the drive and driven gears.

2. The journal turning lathe of claim 1 and further including a first stabilizer bracket affixed to and rotatable with the drive gear at a location diametrically opposed to said drive bracket assembly and a second stabilizer bracket affixed to and rotatable with the driven gear at a location diametrically opposed to said support bracket assembly; and three parallel stabilizer rods coupled at opposed ends to said first and second stabilizer brackets.

3. The journal turning lathe of claim 1 wherein the coupling shaft has a protective sheath surrounding the coupling shaft.

4. The journal turning lathe of claim 1 wherein the gear trains include:

a) a first idler gear meshing with the drive gear;

b) a second idler gear meshing with the first idler gear; and c) a collar gear coupled to the coupling shaft, said collar gear meshing with the second idler gear so that rotation of the drive gear turns the first and second idler gears and the collar gear turning the coupling shaft.

5. The journal turning lathe of claim 4 wherein the collar gear includes;

a) a central opening; and b) an adjustable hex collar member capping one end of the coupling shaft, said hex collar being inserted into the central opening and coupled to the collar gear.

6. The journal turning lathe of claim 1 wherein the radially adjustable drive bracket assembly includes:

a) a drive bracket member comprising a block member having a cam arm assembly aperture radially disposed in the block member, a pair of axially disposed guide shaft bores wherein the slide rails are inserted at one end into the guide shaft bores, and a feed screw bore receiving a first end of the threaded lead screw;

b) a first and second side bracket affixed to side surfaces of the block member;

c) a drive bracket slide coupled to the drive bracket member by the first and second side bracket;

d) a drive bracket slide base coupled to the annular drive gear, wherein the drive bracket slides inside the drive bracket slide base; and e) a drive bracket height adjustment screw assembly located on the drive bracket slide, said drive bracket height adjustment screw assembly comprising a feed screw with a drive bracket feed nut thereon coupled to the drive bracket slide base and a height adjustment bracket secured to the drive bracket slide, said feed screw passing through an aperture in the height adjustment bracket, whereby turning the feed screw allows the slide plate to be adjusted radially.

7. The journal turning lathe of claim 1 wherein the radially adjustable support bracket assembly includes:

a) a support bracket slide base coupled to the annular driven gear;

b) a support bracket slide capable of sliding in the support bracket slide base;

c) a support bracket height adjustment assembly comprising a radially extending feed screw a second height adjustment bracket disposed on the support bracket slide plate holding the radially extending feed screw, and a feed nut coupled to the support bracket slide whereby turning the radially extending feed screw allows the support bracket slide to be adjusted radially;

d) an end bracket member comprising a generally rectangular block having a pair of longitudinally extending bores for receiving a second end of the slide rail, a feed screw bore for receiving a second end of the threaded lead screw, and a pair of parallel spaced-apart fastener bores disposed on each width dimension side of the rectangular base; and e) a pair of axial adjustment bracket assemblies securing the end bracket member to the support bracket slide wherein axial adjustment bracket assemblies comprise an adjustment bracket member having a pair of spaced-apart oval apertures, a pair of spaced-apart parallel flanges disposed between the oval apertures, a support bore disposed between the parallel flanges and a support side bracket, said support side bracket comprising a bracket having a single aperture cut into the middle of said support side bracket, wherein each adjustment bracket is coupled to the end bracket member by passing an axial adjustment fastener through each oval aperture and securing said fastener in a corresponding fastener bore disposed in the end bracket and securing the support side bracket between the parallel flanges and securing the support side bracket to the support bracket slide.

8. The journal turning lathe of claim 1 wherein the cutting head assembly comprises:

a) a cutting head housing including a pair of guide shaft bores extending axially through the cutting head housing adapted to receive the parallel slide rails, a feed screw bore extending axially through the cutting head housing adapted to receive the threaded lead screw, and a tool block slot cut radially into the cutting head housing;

b) a tool block assembly disposed in the tool block slot, the tool block assembly comprising a tool block holding a tool bit, and adjustable gibs slidingly holding the tool block in the tool block slot; and c) a tool bit adjustable screw assembly for radially adjusting the tool block comprising a tool block feed screw carrying a tool block feed nut operatively coupled to the tool block, and a tool block feed screw bracket secured to the adjustable gibs holding the feed screw for rotation in the cutting head housing.

9. A journal turning lathe for machining a work piece having a tapered surface, comprising:

a) an annular drive housing adapted to be concentrically secured to a work piece at a first location therealong, the drive housing having an annular drive gear journaled for rotation therein;

b) an annular support housing adapted to be concentrically secured to the work piece at a second location thereal-ong, the support housing having an annular driven gear journaled for rotation therein;

c) means for maintaining the drive housing and support housing in parallel, spaced-apart relation in surrounding relation to the work piece;

d) a first slide assembly affixed to and rotatable with the drive gear and a second slide assembly affixed to and rotatable with the annular driven gear;

e) a pair of parallel glide shafts having opposed ends affixed to the first and second slide assemblies, wherein adjustment of the first and second slide assemblies puts the glide shafts in parallel alignment with the tapered surface;

f) a cutting head assembly mounted on the glide shafts and slidable therealong; and g) means for driving the annular drive gear and annular driven gear in synchronous relation.

10. The journal turning lathe as in claim 9 wherein the radial position of the first and second slide assemblies relative to the drive housings and support housing is manually adjustable.

11. The journal turning lathe as in claim 9 and further including means coupled to the cutting head assembly for incrementally displacing the cutting head assembly along the parallel glide shafts in relation to the rotation of the annular drive gear and annular driven gear.

* * * * *